Feb. 13, 1934.  T. H. EICKHOFF ET AL  1,946,525
TWO-WAY SHOCK ABSORBER
Filed Jan. 23, 1931   7 Sheets-Sheet 1
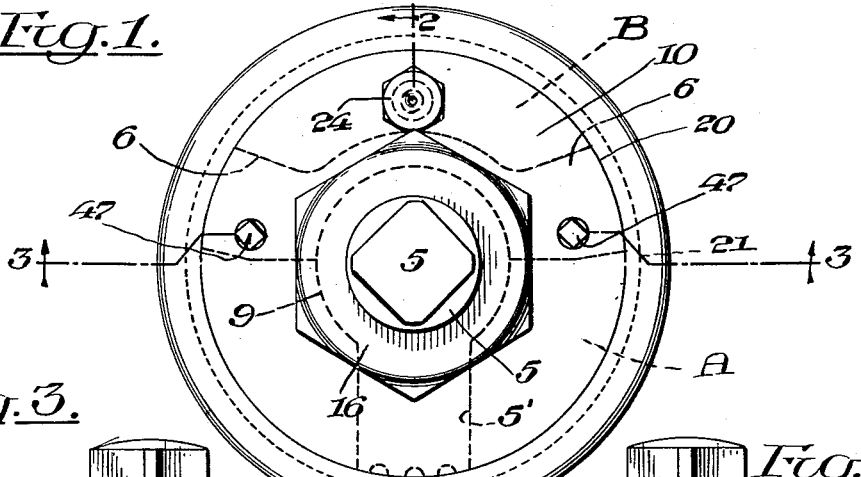
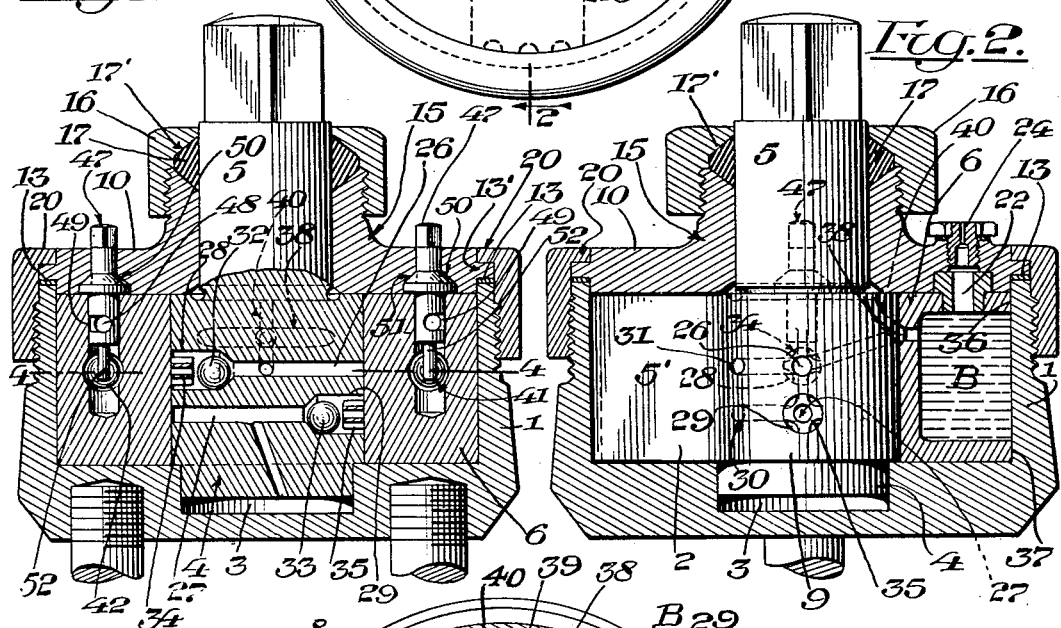

Feb. 13, 1934. T. H. EICKHOFF ET AL 1,946,525
TWO-WAY SHOCK ABSORBER
Filed Jan. 23, 1931 7 Sheets-Sheet 2

Inventors,
Theodore H. Eickhoff
F. Dexter Sanborn Jr.
Alfred E. Dreissner
by their Attorney

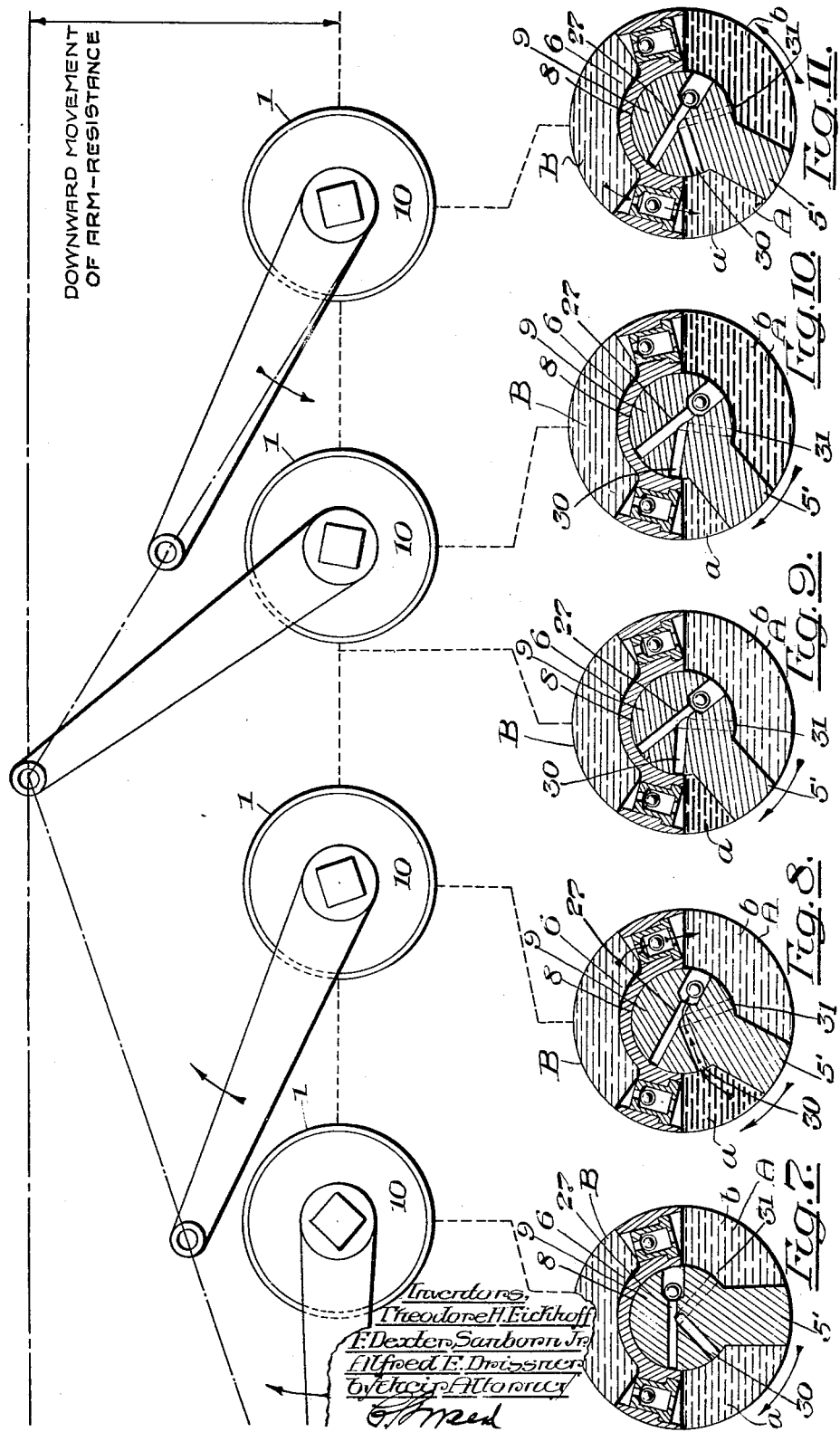

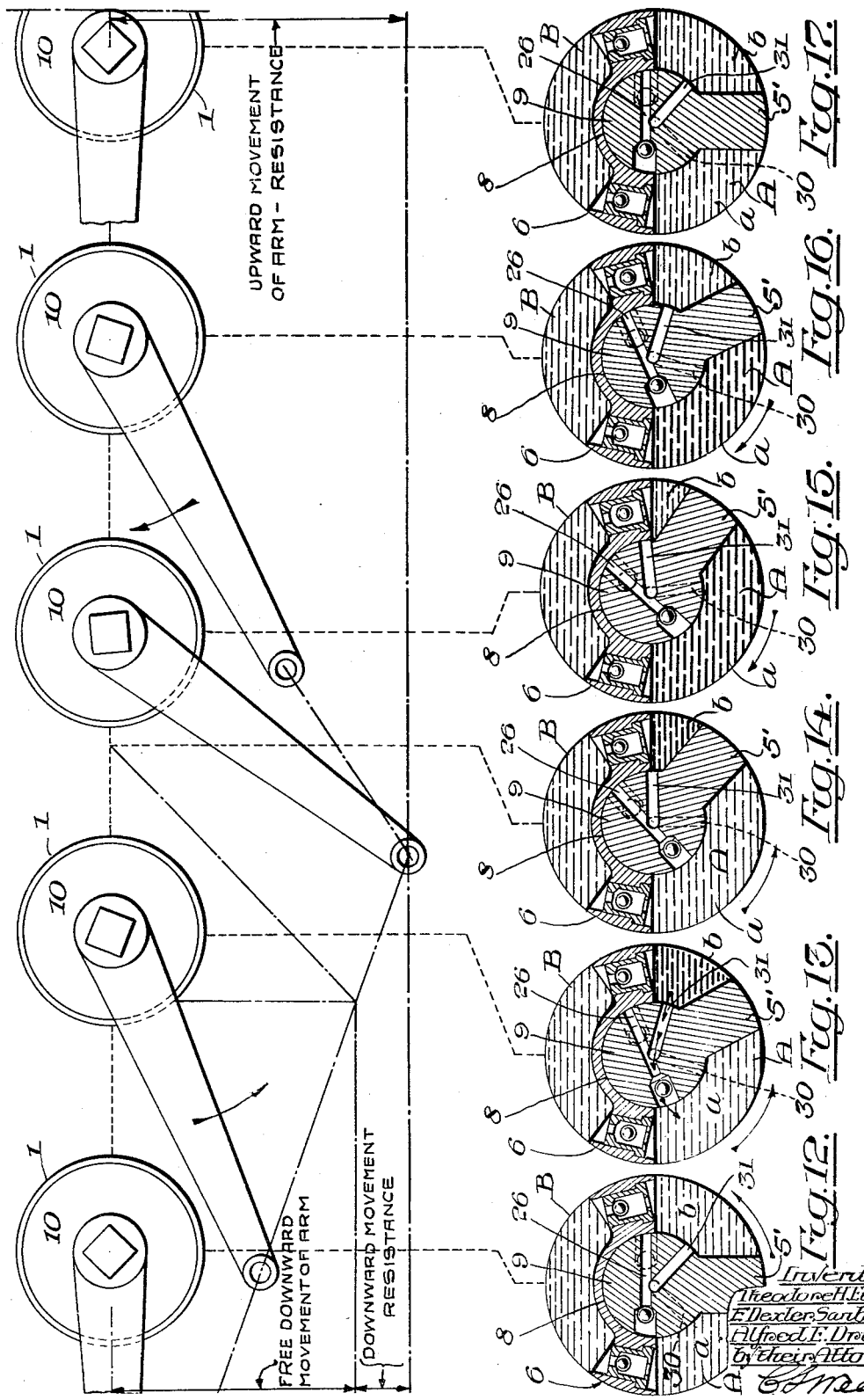

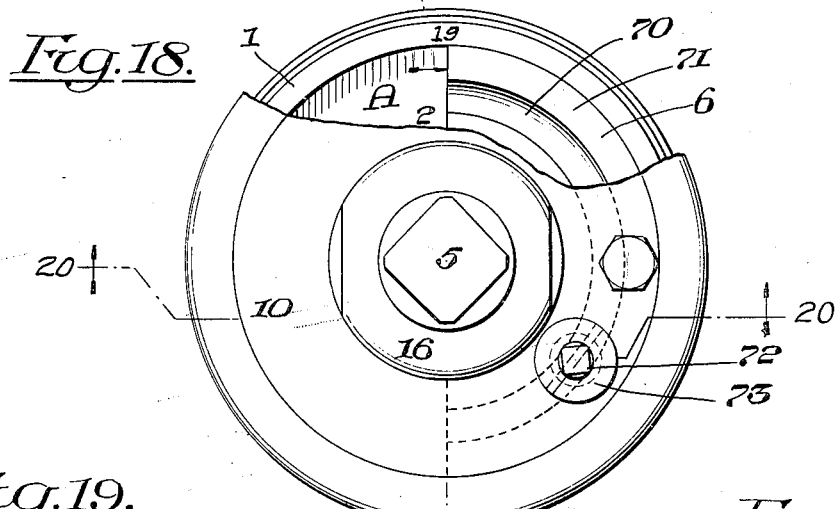
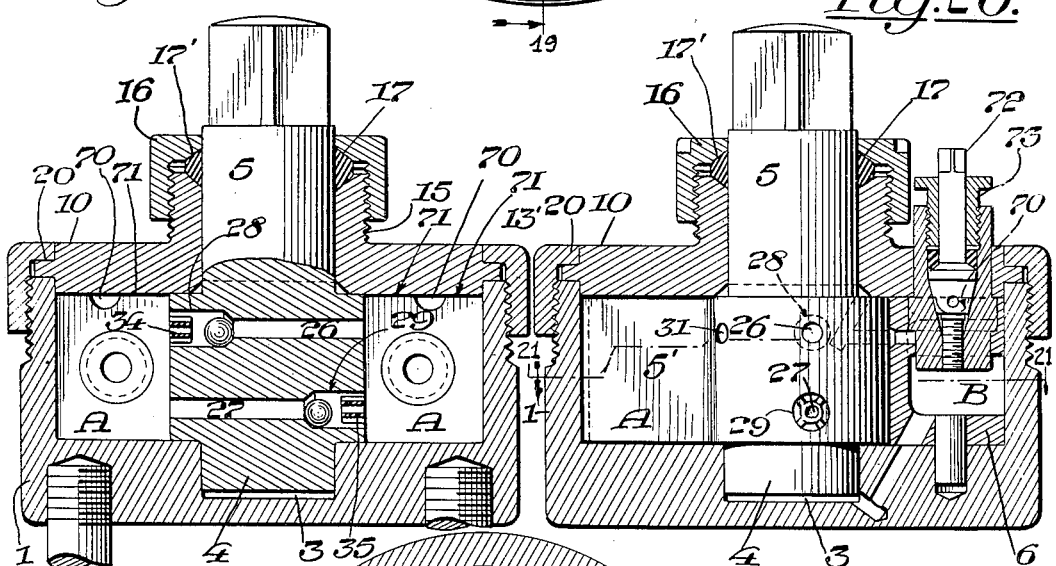
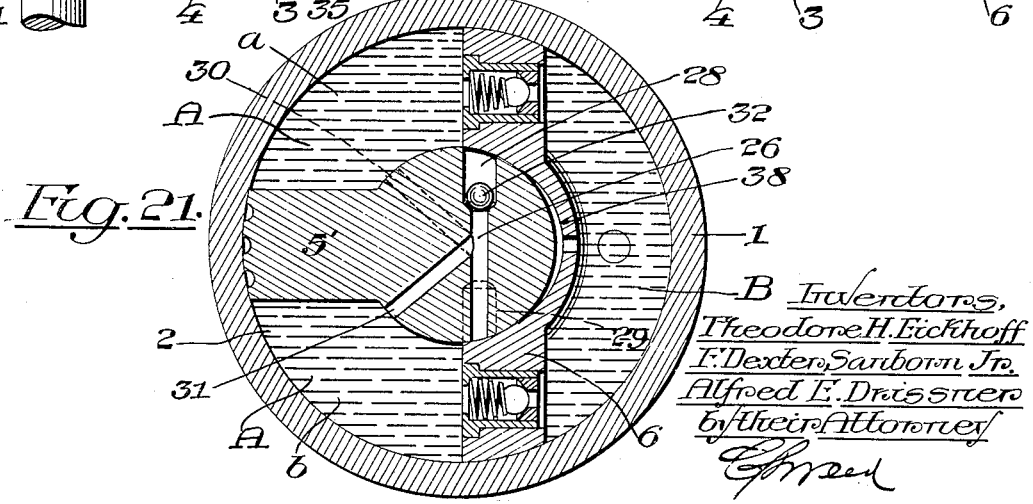

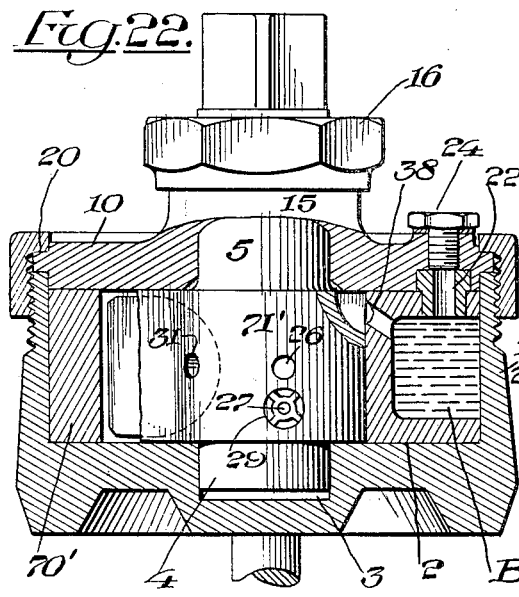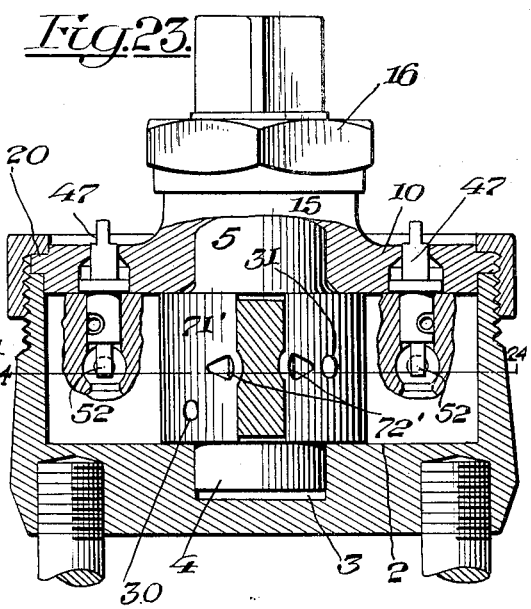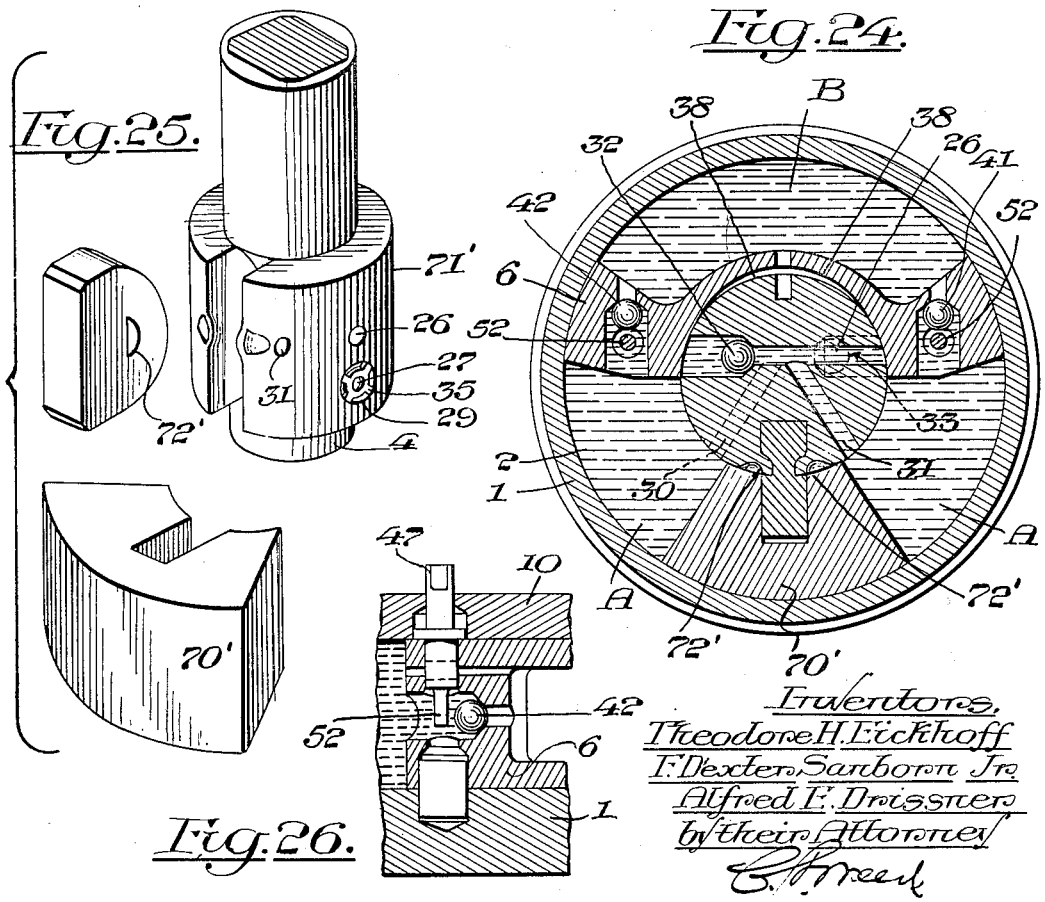

Inventors,
Theodore H. Eickhoff
F. Dexter Sanborn Jr.
Alfred E. Drissner
by their Attorney Patented Feb. 13, 1934

1,946,525

UNITED STATES PATENT OFFICE 1,946,525

TWO-WAY SHOCK ABSORBER

Theodore H. Eickhoff, Frederick Dexter Sanborn, Jr., and Alfred E. Drissner, Cleveland, Ohio, assignors to The National Acme Company, Cleveland, Ohio, a corporation of Ohio Application January 23, 1931. Serial No. 510,624

19 Claims. (Cl. 188—89)

This invention relates to shock absorbers, more particularly to hydraulic shock absorbers especially adapted for use with motor vehicles, the object of the invention being to provide an improved shock absorber, simple in construction, inexpensive to manufacture and effective in use, and by means of which the body of the vehicle will be efficiently cushioned.

A further object of the invention is the provision of an improved shock absorber in which sudden and excessive shocks will be completely absorbed by the liquid within the shock absorber by reason of the fact that the construction of the shock absorber is such that during the ordinary movement of the piston or the first movement thereof, the liquid will pass from one compartment into another but, during the final movement, or when the vehicle is subjected to sudden and excessive shocks, the passage of such liquid is prevented with the result that the liquid in the compartment will completely absorb the shock and cushion the vehicle body.

As known forms of vehicle body suspension means now in use have very bad rebound or reactionary tendencies, it is necessary to dampen them without affecting the flexibility of the structure.

In the present improvement, this dampening feature is obtained by an improved two-way shock absorber which is so constructed as to allow the flexible suspension member freedom of movement under shock and to dampen, retard or resist the action or movement of the member itself.

In the drawings accompanying and forming a part of this specification, Fig. 1 is an end view of this improved shock absorber.

Fig. 2 is a cross-sectional view taken on line 2—2 of Fig. 1.

Fig. 3 is a cross-sectional view taken on line 3—3 of Fig. 1.

Fig. 4 is a cross-sectional view of the shock absorber taken on line 4—4 of Fig. 3.

Figs. 7, 8, 9, 10 and 11 are diagrammatic views illustrating the movement of the piston in one direction.

Figs. 12, 13, 14, 15, 16 and 17 are diagrammatic views illustrating the movement of the piston in the opposite direction.

Fig. 18 is an end view of a modified form of this improved shock absorber.

Fig. 19 is a cross-sectional view taken on line 19—19 of Fig. 18.

Fig. 20 is a cross-sectional view taken on line 20—20 of Fig. 18.

Fig. 21 is a cross-sectional view taken on line 21—21 of Fig. 20.

Fig. 22 is a cross-sectional view of another modified form of this improved shock absorber.

Fig. 23 is a similar cross-sectional view taken at an angle to that shown in Fig. 22.

Fig. 24 is a cross-sectional view taken on the line 24—24 of Fig. 23.

Fig. 25 represents detail views of the piston or vane of this form of shock absorber.

Fig. 26 is a detail sectional view of one of the abutment valve means shown in Fig. 24.

Similar characters of reference indicate corresponding parts in the several views.

Figure 5:
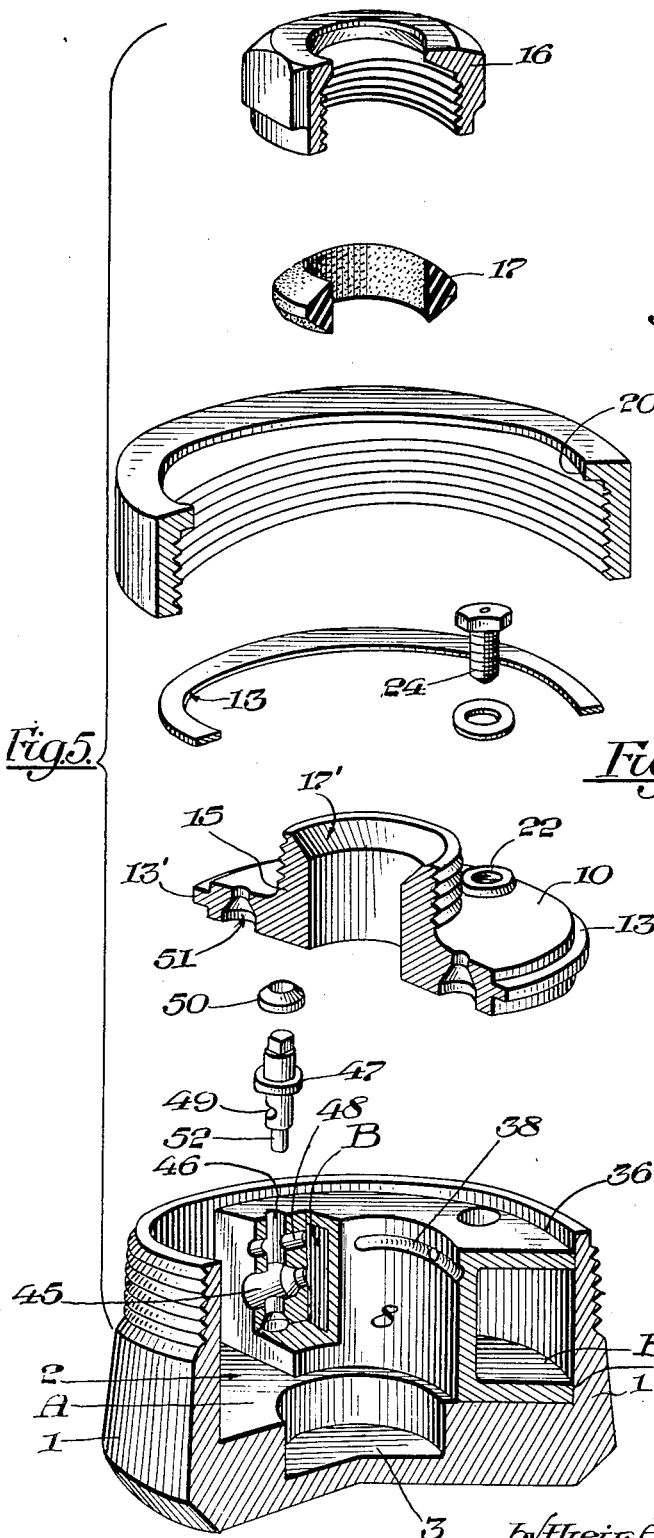
Fig. 5 represents perspective detail views of the housing members of the shock absorber comprising the housing body, cover and means for assembling these parts.
Figure 6:
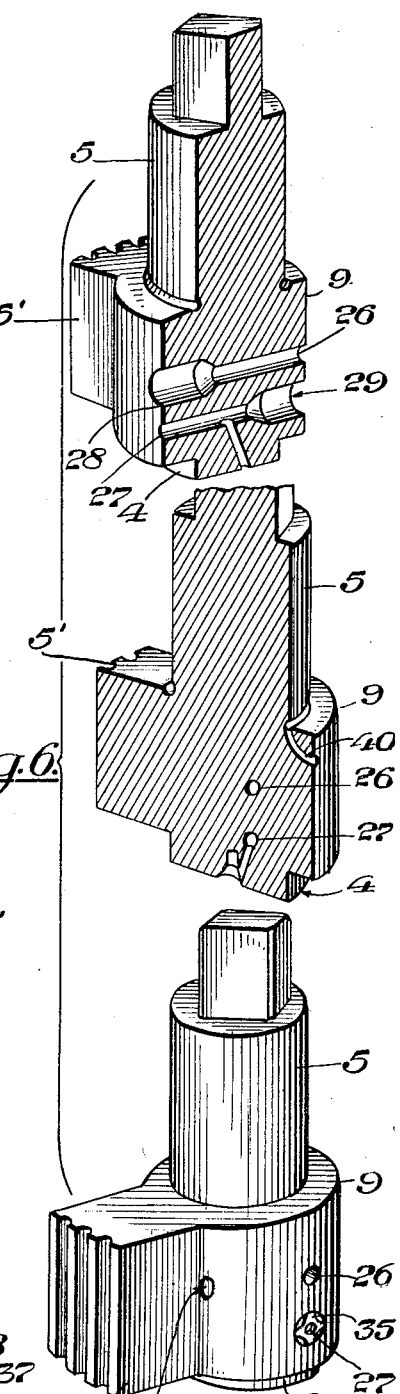
Fig. 6 represents detail perspective views of the piston or vane member of the shock absorber, the latter being shown in section.

Before explaining in detail the present improvement and mode of operation thereof, we desire to have it understood that the invention is not limited to the details of construction and arrangement of parts which are illustrated in the accompanying drawings, since the invention is capable of other embodiments, and that the phraseology which we employ is for the purpose of description and not of limitation.

In the form of shock absorber shown in Figs. 1 to 17, a housing or casing 1 is provided with a chamber 2 for the reception of the operating parts. This housing has a bottom bore 3 to support the lower journal 4 of the piston or vane shaft 5 having the vane or wing 5'.

Located within the chamber is a segmentally formed chamber or reservoir member or abutment 6 of generally U-shaped form, it being secured therein against movement in any suitable way and has its outer edges closed by the casing. This reservoir member forms a storage space and divides the housing into a pair of compartments A and B, the compartment A forming the working chamber and the compartment B the reservoir chamber, the passage of fluid from the reservoir chamber B being controlled by suitable valves located in the opposite ends of the reservoir chamber.

This segmental chamber-formed member 6 also acts as a seal for the valves located in the enlarged portion of the piston or vane and gives additional support to the vane. This reservoir member of channel formation fits fluid tight at its edges 36—37 in the chamber of the housing and is provided with a pressure relief recess 38 and relief opening 39. This relief recess 38 communicates with a relief passage 40 of the piston shaft 5 hereinbefore referred to, thus relieving any pressure that might build up in the valve stem bearing section. The reservoir member 6 is also provided with ball valves 41 and 42 so arranged as to supply liquid immediately to the increasing volume side. That is to say, when the shaft 5 is turning clockwise, the valve 41 opens and allows the fluid to enter the expanding space on the right and when the shaft is turning counter-clockwise, the valve 42 opens allowing the fluid to enter the left hand expanding side. The valve balls may be retained by any conventional means, with or without a spring.

The vane or piston shaft 5 is assembled in the housing in such manner as to permit free angular movement of the same and is retained therein by a cover 10 located to project into and over the edge of the casing at the open end of the housing, a gasket 13 being located between an annular shoulder 13' of the cover and the free edge of the housing to prevent fluid leakage. The cover is held on to the housing by means of a threaded flanged ring 20 turned on to the housing. The cover is located in its proper position by means of a hollow plug 22 projecting through the cover into and through a side wall of the reservoir chamber, and this permits the proper filling of the reservoir chamber. This hollow plug is closed by means of a screw 24 having a vent which tightens the cover on its gasket, thus sealing against leakage while in operation.

The vane shaft 5 projects through the hub 15 of the cover 10 and has the end thereof machined to receive any of the conventional connecting arms. This hub 15 of the cover is externally threaded to receive a packing nut 16 which compresses a packing 17 between chamfered portions 17' of the cover 10 and nut 16, thus sealing the instrument against leakage through the shaft bearing in the hub 15.

Through the enlarged portion 9 of the ribbed or corrugated piston or vane 5' is a pair of valve holes 26 and 27 counterbored as at 28 and 29, the counterbores thus being at the opposite ends of the respective holes. The ribs or corrugations lessen the friction, insure a better fit and decrease the work of machining the entire surface of the vane and thereby avoid inequalities of the vane surface.

The enlarged portion 9 of the piston or shaft is also provided with openings 30 and 31 located at angular distances from the valve holes 26 and 27 so as to intercept their respective holes, the opening 31 intercepting valve hole 26 and the opening 30 intercepting valve hole 27.

Relief ball valves 32 and 33 are seated in the holes 26 and 27, respectively, at the bottom of the counterbores 28 and 29, and retainer plugs 34 and 35 are pressed and spun in to these holes so as permit the ball valves to have only the proper movement.

In operation, the curved surface or seat 8 of the reservoir member 6 opens and closes the ports formed by the holes 26 and 27, 30 and 31, in the manner shown in the diagrammatic views 7 to 17.

In the reservoir member 6 transverse holes are located, one at each end, to communicate with valve holes 46 and in each of these holes 45 is located a stem valve 47. This stem valve has a groove 49 coinciding with a by-pass hole 48 when fully opened. A packing 50 seals against leakage and fits into the counterbore 51 of the cover. By adjusting this valve, a finer adjustment of the shock absorber is obtained. The end 52 of the valve stem projects into a counterbore behind the ball valves 42, thus retaining it.

In the operation of the shock absorber, it will be observed, viewing Figures 7 to 11, in which the piston or vane movement is clockwise and viewing Figures 11 to 17 in which the piston or vane moves counter clockwise, that the gist of the improvement is that there will always be a cushion of liquid back of the vane to absorb the shock.

In prior shock absorbers, there is an opening through the piston to permit the passage of the liquid from one side to the other of the working chamber and this opening is never completely closed so that, in consequence, liquid is forced through this passage with the result that the car hits bottom during a shock even though there may be some liquid remaining in the compartment, this being insufficient to cushion the body.

In Figure 7, it will be noted that the vane shaft is in its central position with the low pressure ports open on both sides. As soon as the vane shaft turns in the direction of the arrow, Figure 8, the liquid passes in the direction of the arrows from the low pressure side through the passages 30 and 27, and, therefore, out of the compartment $a$ into the compartment $b$, thus forming a low pressure instrument. When the shock increases, as shown in Figure 9, the low pressure port 30 is closed by the bearing wall 8 of the segmental-formed reservoir 6 so that no liquid can pass through the pressure passages 30 and 27 and, therefore, the full resistance of the liquid in the chamber $a$ takes up the shock of the body of the car so that it is impossible for the body to strike bottom or the axle.

The result is that, during the first movement of the piston in the direction of the arrows, the liquid will pass from the chamber $a$ to the chamber $b$ through the passages in the piston or vane but during the latter part of this movement as, for instance, during an unusual or sudden shock, those passages are completely closed so that the fluid remaining in the compartment $a$ will fully absorb the shock. As this shock absorber includes a movable part there is necessarily some leakage around the piston. The clearance around the piston is small and, therefore, the liquid passes slowly, absorbing the shock and, due to this leakage, the fluid must be compressed even when the ports are closed to a greater extent than when the ports are open, thus permitting the fluid to be more compressed and the shock to be more thoroughly absorbed, the structure acting very much like a leaking piston having several piston rings.

Figures 12 to 17 illustrate the reverse of this, wherein the piston moves counter clockwise and, consequently, the liquid passes from the chamber $b$ to the chamber $a$ until, as will be seen by the arrows in Figure 13, the passages 31 and 26 through the piston are completely closed by the segmental wall of the reservoir member 6, closing the passage 31, whereupon the liquid remaining in the chamber $b$ will fully absorb the shock.

In the several modifications, the operation of the shock absorber is the same but, in the form shown in Figs. 18 to 21, the shock absorber is provided with a single adjusting means in the reservoir member (see Fig. 20). This reservoir member has a groove 70 in its top surface 71 with a perforated valve 72 of suitable design located midway of this groove to register with the groove. This valve is effective to allow only the passage of a certain amount of liquid, depending upon the adjustment of the valve stem, the valve being suitably secured in position by a stuffing box 73 to project through the cover of the shock absorber.

In Figures 22 to 26, a modified form of wing or vane is shown in which the wing 70' is of segmental form and is keyed to the enlarged portion 71' of the piston shaft and, for this purpose, the enlarged portion and wing are provided with slots for the reception of a key secured in position by upsetting the metal at each side of the enlarged portion 71' of the shaft, this upset metal projecting into the recess 72' formed in the key.

Figure 27:
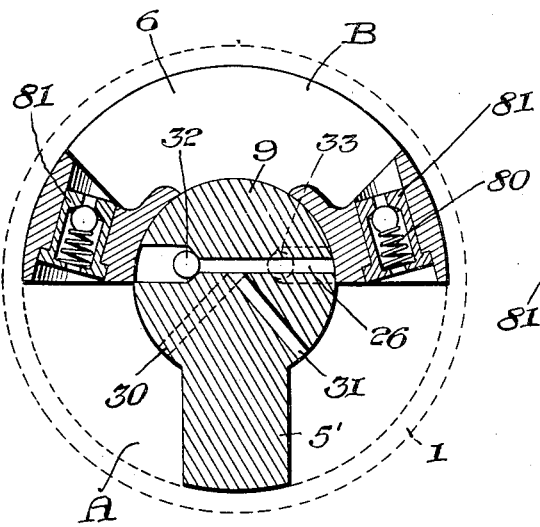
Figs. 27, 28 and 29 are cross-sectional views of modified details of this improved shock absorber.
Figure 28:
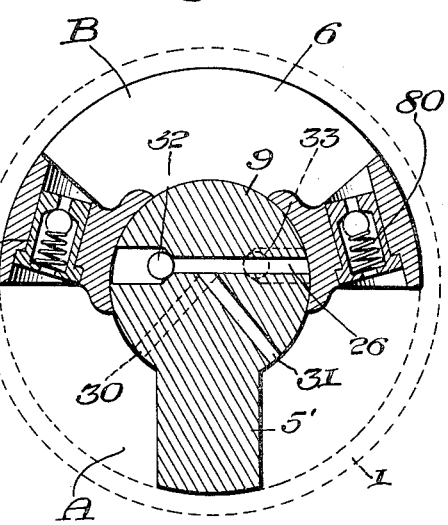
Figure 29:
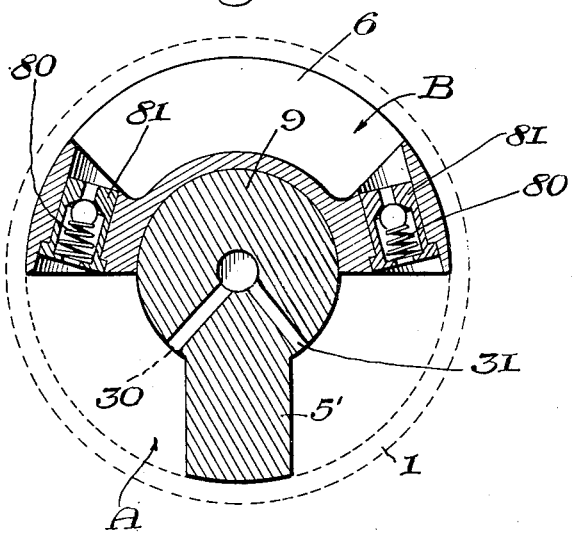

In the forms shown in Figs. 27, 28 and 29, the ball valves in the abutments are secured in position by means of springs 80 and suitable cages 81 and, in Figs. 27 and 28, the reservoir chamber is formed by a pair of abutments instead of a single abutment, as shown in Fig. 29.

Figure 30:
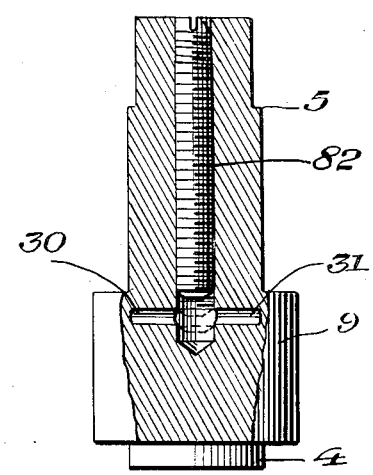
Fig. 30 is a partly sectional view of an oil regulating means.

In Fig. 30, an oil regulating means 82 for use through the stem or shaft of the wing or vane piston is shown.

It is to be understood that by describing in detail herein any particular form, structure or arrangement, it is not intended to limit the invention beyond the terms of the several claims or the requirements of the prior art.

Having thus explained the nature of our said invention and described a way of constructing and using the same, although without attempting to set forth all of the forms in which it may be made, or all of the modes of its use, we claim:

1. A hydraulic shock absorber comprising a casing, an abutment therein dividing the casing into a reservoir chamber and a working chamber and having a seat, a shaft journaled in said casing having a part fitting said seat and a wing piston co-operating with said shaft and dividing the working chamber into a pair of compartments, said shaft having fluid passages therein leading from one compartment to the other for the passage of fluid and in position to be completely closed by the seat wall of the abutment when the piston is shifted into a predetermined position, thereby to prevent the passage of fluid from one compartment into the other, said passages comprising parallel valve controlled passages therethrough, each in communication with a diagonally located passage opening into a compartment.

2. A hydraulic shock absorber comprising a casing, an abutment therein dividing the casing into a reservoir chamber and a working chamber and having a seat, a shaft journaled in said casing having a part fitting said seat and a wing piston co-operating with said shaft and dividing the working chamber into a pair of compartments, said shaft having fluid passages therein leading from one compartment to the other for the passage of fluid and in position to be completely closed by the seat wall of the abutment when the piston is shifted into a predetermined position, thereby to prevent the passage of fluid from one compartment into the other, said passages comprising parallel valve controlled passages therethrough, each in communication with a diagonally located passage opening into a compartment, said abutment having valve controlled means at each side of the shaft for the passage of fluid from the reservoir chamber to the working chamber.

3. A hydraulic shock absorber comprising a casing, an abutment therein dividing the casing into a reservoir chamber and a working chamber and having a seat, a shaft journaled in said casing having a part fitting said seat and a wing piston co-operating with said shaft and dividing the working chamber into a pair of compartments, said shaft having fluid passages therein leading from one compartment to the other for the passage of fluid and in position to be completely closed by the seat wall of the abutment when the piston is shifted into a predetermined position, thereby to prevent the passage of fluid from one compartment into the other, said passages comprising parallel valve controlled passages therethrough, each in communication with a diagonally located passage opening into a compartment, said abutment comprising a segmentally formed chamber within said casing.

4. A hydraulic shock absorber comprising a casing, an abutment therein dividing the casing into a reservoir chamber and a working chamber and having a seat, a shaft journaled in said casing having a part fitting said seat and a wing piston co-operating with said shaft and dividing the working chamber into a pair of compartments, said shaft having fluid passages therein leading from one compartment to the other for the passage of fluid and in position to be completely closed by the seat wall of the abutment when the piston is shifted into a predetermined position, thereby to prevent the passage of fluid from one compartment into the other, said passages comprising parallel valve-controlled passages therethrough, each in communication with a diagonally located passage opening into a compartment, said abutment comprising a substantially U-shaped chamber within said casing having its outer side closed by the casing.

5. A hydraulic shock absorber comprising a casing, an abutment therein dividing the casing into a reservoir chamber and a working chamber and having a seat, a shaft journaled in said casing having a part fitting said seat and a wing piston co-operating with said shaft and dividing the working chamber into a pair of compartments, said shaft having fluid passages therein leading from one compartment to the other for the passage of fluid and in position to be completely closed by the seat wall of the abutment when the piston is shifted into a predetermined position, thereby to prevent the passage of fluid from one compartment into the other, said abutment comprising a segmentally formed chamber within said casing and having a relief groove in its seat wall.

6. A hydraulic shock absorber comprising a casing, an abutment therein dividing the casing into a reservoir chamber and a working chamber and having a seat, a shaft journaled in said casing having a part fitting said seat and a wing piston co-operating with said shaft and dividing the working chamber into a pair of compartments, said shaft having fluid passages therein leading from one compartment to the other for the passage of fluid and in position to be completely closed by the seat wall of the abutment when the piston is shifted into a predetermined position, thereby to prevent the passage of fluid from one compartment into the other, said passages comprising parallel valve-controlled passages therethrough, each in communication with a diagonally located passage opening into a compartment, said abutment having at each side of the shaft valves for controlling the passage of fluid from the reservoir chamber into the working chamber, and also having regulating valves.

7. A hydraulic shock absorber comprising a casing, an abutment therein dividing the casing into a reservoir chamber and a working chamber and having a semi-circular seat, a shaft journaled in said casing and having an enlargement fitting said seat and a wing piston co-operating with said shaft and dividing the working chamber into a pair of compartments, said shaft having fluid passages therein leading from one compartment to the other for the passage of fluid and in position to be completely closed by the seat wall of the abutment when the piston is shifted into a predetermined position, thereby to prevent the passage of fluid from one compartment into the other, said passages comprising parallel valve controlled passages therethrough, each in communication with a diagonally located passage opening into a compartment.

8. A hydraulic shock absorber comprising a casing, an abutment therein dividing the casing into a reservoir chamber and a working chamber and having a semi-circular seat, a shaft journaled in said casing and having a part fitting said seat and a wing piston co-operating with said shaft and dividing the working chamber into a pair of compartments, said shaft having a pair of fluid passages extending therethrough and also having a pair of diagonally located fluid passages, each communicating with a compartment and with one of said first passages and in position to be completely closed by the seat wall of the abutment when the piston is shifted into a predetermined position, thereby to prevent the passage of fluid from one compartment into the other.

9. A hydraulic shock absorber comprising a casing, an abutment therein dividing the casing into a reservoir chamber and a working chamber and having a semi-circular seat, a shaft journaled in said casing and having a part fitting said seat and a wing piston co-operating with said shaft and dividing the working chamber into a pair of compartments, said shaft having a pair of fluid passages extending therethrough and also having a pair of diagonally located fluid passages, each communicating with a compartment and with one of said first passages and in position to be completely closed by the seat wall of the abutment when the piston is shifted into a predetermined position, thereby to prevent the passage of fluid from one compartment into the other, each of said first passages having a valve therefor.

10. A hydraulic shock absorber comprising a casing, an abutment therein dividing the casing into a reservoir chamber and a working chamber and having a semi-circular seat, a shaft journaled in said casing and having a part fitting said seat and a wing piston co-operating with said shaft and dividing the working chamber into a pair of compartments, said shaft having a pair of fluid passages extending therethrough and also having a pair of diagonally located fluid passages, each communicating with a compartment and with one of said first passages and in position to be completely closed by the seat wall of the abutment when the piston is shifted into a predetermined position, thereby to prevent the passage of fluid from one compartment into the other, each of said first passages having a valve therefor and said abutment having at each side of the piston valve controlled passages communicating with the reservoir chamber.

11. A hydraulic shock absorber comprising a casing, an abutment therein dividing the casing into a reservoir chamber and a working chamber and having a semi-circular seat, a shaft journaled in said casing and having a part fitting said seat and a wing piston co-operating with said shaft and dividing the working chamber into a pair of compartments, said shaft having a pair of fluid passages extending therethrough and also having a pair of diagonally located fluid passages, each communicating with a compartment and with one of said first passages and in position to be completely closed by the seat wall of the abutment when the piston is shifted into a predetermined position, thereby to prevent the passage of fluid from one compartment into the other, each of said first passages having a valve therefor and said abutment having at each side of the piston valve controlled passages communicating with the reservoir chamber, and also having valve regulating means located in position to be manipulated from the outside of the casing.

12. A hydraulic shock absorber comprising a casing, a chambered abutment therein dividing the casing into a reservoir chamber and a working chamber and having a semi-circular seat provided with a relief groove and an opening into the reservoir chamber, a shaft journaled in said casing and having an enlargement fitting said seat, a wing piston co-operating with said shaft and dividing the working chamber into a pair of compartments, the enlargement of said shaft having a pair of valve controlled parallel straight fluid passages therethrough and also having a pair of diagonally located fluid passages, one communicating with each compartment and with one of said valve controlled passages and in position to be completely closed by the seat wall of the abutment when the piston is shifted into a predetermined position thereby to prevent the passage of fluid from one compartment into the other, said shaft enlargement also having a passage leading to the relief recess in the abutment seat, and valve controlled openings carried by the abutment, one at each side of the shaft, said abutment comprising a segmentally formed U-shaped chamber having a tight fit against the inner wall of the casing.

13. A hydraulic shock absorber comprising a casing, an abutment therein dividing the casing into a reservoir chamber and a working chamber and having a seat, a shaft journaled in said casing having a part fitting said seat and a wing piston co-operating with said shaft and dividing the working chamber into a pair of compartments, said shaft having parallelly and diagonally located fluid passages therein leading from one compartment to the other for the passage of fluid and in position to be completely closed by the seat wall of the abutment when the piston is shifted into a predetermined position, thereby to prevent the passage of fluid from one compartment into the other, and oil regulating means carried by the shock absorber.

14. A hydraulic shock absorber comprising a casing, an abutment therein dividing the casing into a reservoir chamber and a working chamber and having a seat, a shaft journaled in said casing having a part fitting said seat, a wing piston co-operating with said shaft and dividing the working chamber into a pair of compartments, said shaft having parallelly and diagonally located fluid passages therein leading from one compartment to the other for the passage of fluid and in position to be completely closed by the seat wall of the abutment when the piston is shifted into a predetermined position, thereby to prevent the passage of fluid from one compartment into the other, and oil regulating means located adjacent to the shaft of the shock absorber.

15. A hydraulic shock absorber comprising a casing, an abutment therein dividing the casing into a reservoir chamber and a working chamber and having a seat, a shaft journaled in said casing having a part fitting said seat, a wing piston co-operating with said shaft and dividing the working chamber into a pair of compartments, said shaft having fluid passages therein leading from one compartment to the other for the passage of fluid and in position to be completely closed by the seat wall of the abutment when the piston is shifted into a predetermined position, thereby to prevent the passage of fluid from one compartment into the other, and oil regulating means extending into the reservoir chamber forming abutment.

16. A hydraulic shock absorber comprising a casing, an abutment therein dividing the casing into a reservoir chamber and a working chamber and having a seat, a shaft journaled in said casing having a part fitting said seat, a wing piston co-operating with said shaft and dividing the working chamber into a pair of compartments, said shaft having fluid passages therein leading from one compartment to the other for the passage of fluid and in position to be completely closed by the seat wall of the abutment when the piston is shifted into a predetermined position, thereby to prevent the passage of fluid from one compartment into the other, and means for keying the wing piston to the shaft, said shaft and key having parts thereof upset, one into the other.

17. A hydraulic shock absorber comprising a casing, an abutment therein dividing the casing into a reservoir chamber and a working chamber and having a seat, a shaft journaled in said casing and having a part fitting said seat, a wing piston co-operating with said shaft and dividing the working chamber into a pair of compartments, said shaft having a pair of substantially straight parallel valve controlled passages therethrough, each in communication with a diagonally located passage opening into a compartment, one at each side of the piston and in position to be completely closed by the seat wall of the abutment when the piston is shifted into a predetermined position thereby to prevent the passage of fluid from one compartment into the other.

18. A hydraulic shock absorber having a casing, means dividing it into a working chamber and a reservoir chamber, a piston in said working chamber dividing it into a pair of compartments, a shaft carrying said piston, means in the shaft for the passage of fluid from one compartment into the other during certain movements of the piston and comprising a pair of parallelly located passages and a pair of diagonally located passages, and means for completely closing said passages during other movements of the piston thereby to prevent the passage of fluid from one compartment into the other.

19. A hydraulic shock absorber having a casing, means dividing it into a working chamber and a reservoir chamber, a piston in said working chamber dividing it into a pair of compartments, a shaft carrying said piston, means in the shaft for the passage of fluid from one compartment into the other during certain movements of the piston and comprising a pair of parallelly located passages and a pair of diagonally located passages, and means for completely closing said passages during other movement of the piston thereby to prevent the passage of fluid from one compartment into the other, said last means comprising a part of the means forming the reservoir chamber and a part of the shaft co-operating with each other during the movements of the shaft.

THEODORE H. EICKHOFF.
F. D. SANBORN, Jr.
ALFRED E. DRISSNER.